Dec. 15, 1964  G. A. HOTHAM  3,161,725
OPTICAL DISPLACEMENT FOLLOWER
Filed Aug. 17, 1961  3 Sheets-Sheet 1

INVENTOR.
GEOFFREY A. HOTHAM
BY
Beehler & Shanahan
ATTORNEYS

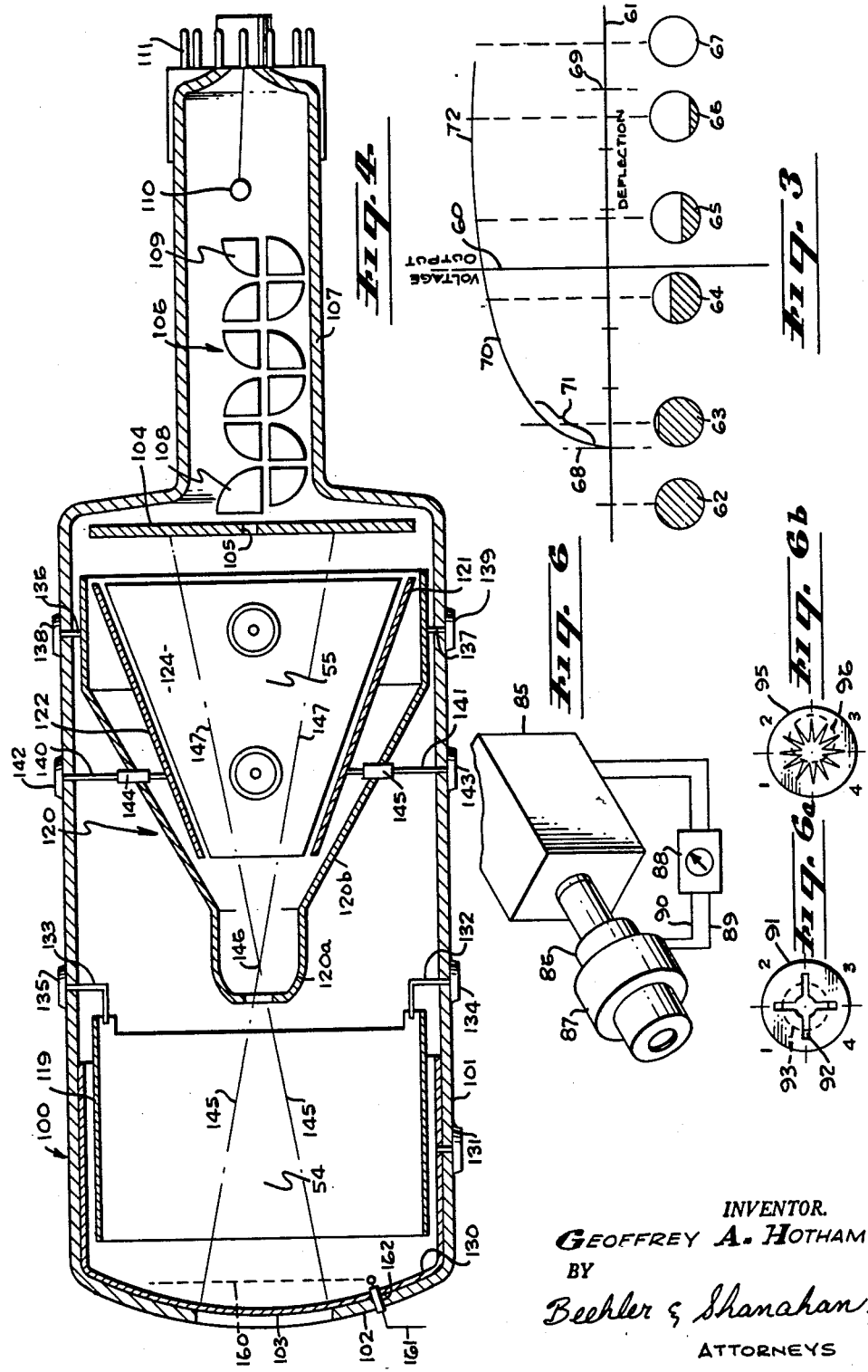

INVENTOR.
GEOFFREY A. HOTHAM
BY
Beehler & Shanahan
ATTORNEYS

United States Patent Office 3,161,725
Patented Dec. 15, 1964

3,161,725
OPTICAL DISPLACEMENT FOLLOWER
Geoffrey A. Hotham, Santa Barbara, Calif., assignor to Optron Corporation, Santa Barbara, Calif., a corporation of California
Filed Aug. 17, 1961, Ser. No. 132,086
18 Claims. (Cl. 178—7.2)

This invention relates generally to displacement followers, and more particularly to a displacement follower in which beam deflection means associated with a tube of the image dissector type is employed in combination with a beam control circuit to retain an electron image, either substantially motionless or in local cyclical movement, at a dissecting aperture, the error signal generated being a measure of the target displacement.

In a first preferred form of the invention, the displacement signal is compared with an adjustable capture voltage in a differential amplifier, and the amplifier output is applied to electrostatic deflection plates of novel design and disposition to control the electron beam within the image dissector tube.

Modern technology has produced many situations in which visual observation of a moving target, and manual control of some devices in response to visually detected movement, are unsatisfactory or impossible.

A currently important example is in the field of tracking missiles. During take off, and for the first few minutes of flight, it is often important to record the flight path of the missile, or to photograph it through a telescopic lens. Heretofore, this has ordinarily been accomplished by means of a gimbal mounted camera and lens controlled by a human observer, who has followed the flight of the missile by eye, with some difficulties and errors. The present device provides, in one form, an optical displacement follower which can be trained upon the moving missile, and caused to generate target displacement signals, which in turn control a motor driven gimbal mounting for both camera and displacement follower, by means of a servo system.

The present invention is not restricted in its utility to missile tracking. It finds many applications in watching movement at any range, whether the target be a distant star or a test speciment within a few feet or a few inches.

The displacement follower of the present invention may be employed to monitor the movement of an object which cannot readily be watched by human eyes. For example, the displacement follower of the present invention may be aimed at the edge of a white hot test specimen undergoing tests; the device of the invention will follow the edge of the test specimen as necking down occurs, so that a continuous precise measurement of deformation may be made during the progress of the tests. Similarly, the displacement follower of the invention may be employed in a radioactive environment to watch the movement of radioactive objects. In some applications of this type, movement is so slow or so small that the rate or amount cannot be measured by manual or visual means, except by very complex devices, or with greater ease, by the displacement follower herein disclosed.

An important application of the invention is in measurement of vibration. A test specimen may be mounted on a table and brilliantly illuminated within view of the displacement follower, which will then produce an output signal indicating with great precision the characteristics of the observed vibration.

It will be seen from the foregoing descriptions of some of the important applications of the invention, that it is a major object of the invention to provide a device which is capable of optically viewing a target, of following movement of the target at very high speed and with great precision, and of producing an output signal from which an operator can obtain the important characteristics of displacement and/or movement, and frequency, amplitude, and wave form of cyclic movement.

It is an associated major object to provide a displacement follower which follows the target by a combination of electron beam displacement and mechanical movement of the viewing tube, the latter being controlled automatically within the system.

Still another improtant object of the invention is to provide a tracking system in which an electronic observing tube accurately aims by operation of its own gimbal mounting through an associated servo system.

With these and other objects in view, the invention consists in the construction, arrangement and combination of the various parts of the device, whereby the objects contemplated are attained, as hereinafter set forth, pointed out in the appended claims, and illustrated in the accompanying drawings by way of specific embodiment and example only, which latter are not to be taken as defining the limits of the invention in all its forms.

In the drawings:

FIGURE 3 is a graphical and diagrammatic representation of the manner in which target boundary movement produces an electron beam signal proportional to displacement;

FIGURE 4 is a view of a longitudinal section through the axis of an image dissector tube constructed for the present invention, with a showing of those details relevant to this invention;

FIGURES 6, 6a, and 6b illustrate a modification of the invention in which X and Y displacement are continuously indicated.

Figure 1:
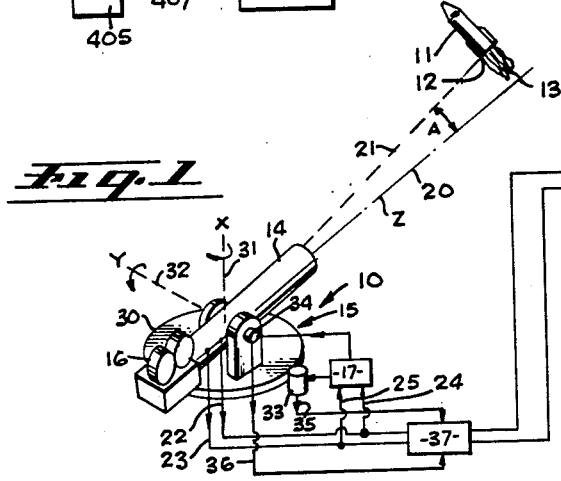
FIGURE 1 is a schematic perspective view, which will be employed for describing the mode of operation of a displacement follower constructed according to the present invention.

A missile tracking unit embodying the invention is diagrammatically represented in FIGURE 1, and indicated generally by the numeral 10. It is shown in action as it tracks a missile 11 by following a target comprised of the sharply defined boundary line 12 between the relatively dark missile 11 and the brilliant light source provided by the rocket flames 13.

The missile tracking device 10 is comprised of a complex assembly of component elements which may be grouped into three categories: a displacement follower 14, a motor driven gimbal mounting 15, a missile camera 16, a servo system 17, by means of which the displacement follower 14 controls the drive for its own gimbal mounting 15, and a flight recording system 18.

The displacement follower 14 will be described in considerable detail in several embodiments in connection with subsequent figures. It will be sufficient for the purposes of understanding FIGURE 1 to know that the displacement follower sights along a bore axis, designated as the Z axis for purposes of explanation, and indicated in FIGURE 1 by the numeral 20. However, as will be explained hereinafter, it is not necessary for the displacement follower 14 to "capture" the target, the boundary line 12 in this instance, exactly on the bore axis 20. The displacement follower 14 may simply be manually and visually turned, possibly with the aid of a sighting telescope, not illustrated, until it is looking at a suitable target boundary some place in the vicinity of the Z axis, although not exactly on it, thus the displacement follower 14 may be aimed at the missile 11 as it stands on the launching pad, just before take-off.

When the tracker 10 is turned on and placed in operation, its viewing tube, described hereinafter in connection with FIGURES 2 and 4, can be adjusted to treat any target position within a reasonable range of Z axis 20 as an initial starting position, even if that initial position actually departs from the Z axis by an angle, as indicated in FIGURE 1 by the angle A, between the Z axis 20 and the line 21 between the displacement follower 14 and the target at boundary 12. After the operator has selected a target for the displacement follower 14, and placed the displacement follower in operation, the displacement follower 14 will generate a signal if the target moves. Moreover, the displacement follower 14 is capable of following movement of the target for a limited range, even if the Z axis of the displacement follower were to be held fixed in space. Of course, as the angle A increases beyond a certain limit, the target is lost, and the displacement follower no longer produces any signal related to its movement.

Thus, in the embodiment illustrated in FIGURE 1, the displacement follower 14 could follow the missile 11 for a short distance, even if the gimbal mounting 15 were locked and the Z axis remained fixed. In the present application, however, the displacement follower 14 produces a signal through lines 22 and 23, which moves through lines 24 and 25 to servo system 17, which drives the motor-driven gimbal mounting 15 so as to keep displacement follower 14 "locked on" the target at boundary line 12, at exactly the same angle A from the Z axis as existed at the initial target position.

The gimbal mounting 15 has a rotatable base 30 which is continuously motor driven to the proper compass position by rotating about a vertical X axis 31. The gimbal mounting 15 also has a horizontal Y axis 32 about which the displacement follower 14 rotates in a vertical plane.

The position of the missile 11 is detected by an X axis pick-up 33 for detecting the rotation about the X axis and a Y axis pick-up 34 for determining rotation about the Y axis. The rotations so detected are transmitted by lines 35 and 36 respectively to a recording means 37 which produces an X record at 38 and Y record at 39 while simultaneously recording the time of each instantaneous position at 40, as indicated by the clock 41.

Note also, that the angle A, whether constant, or varying, is transmitted through lines 22 and 23 to the position recorder 18, in the form of an electronic signal proportional to the displacement of line 21 from line 20. The recorder 18 indicates the displacement of line 20, as revealed by axis pick-ups 33 and 34, with the displacement of the target at boundary 12 from line 20, as indicated by the angle A and the line 21.

Figure 2:
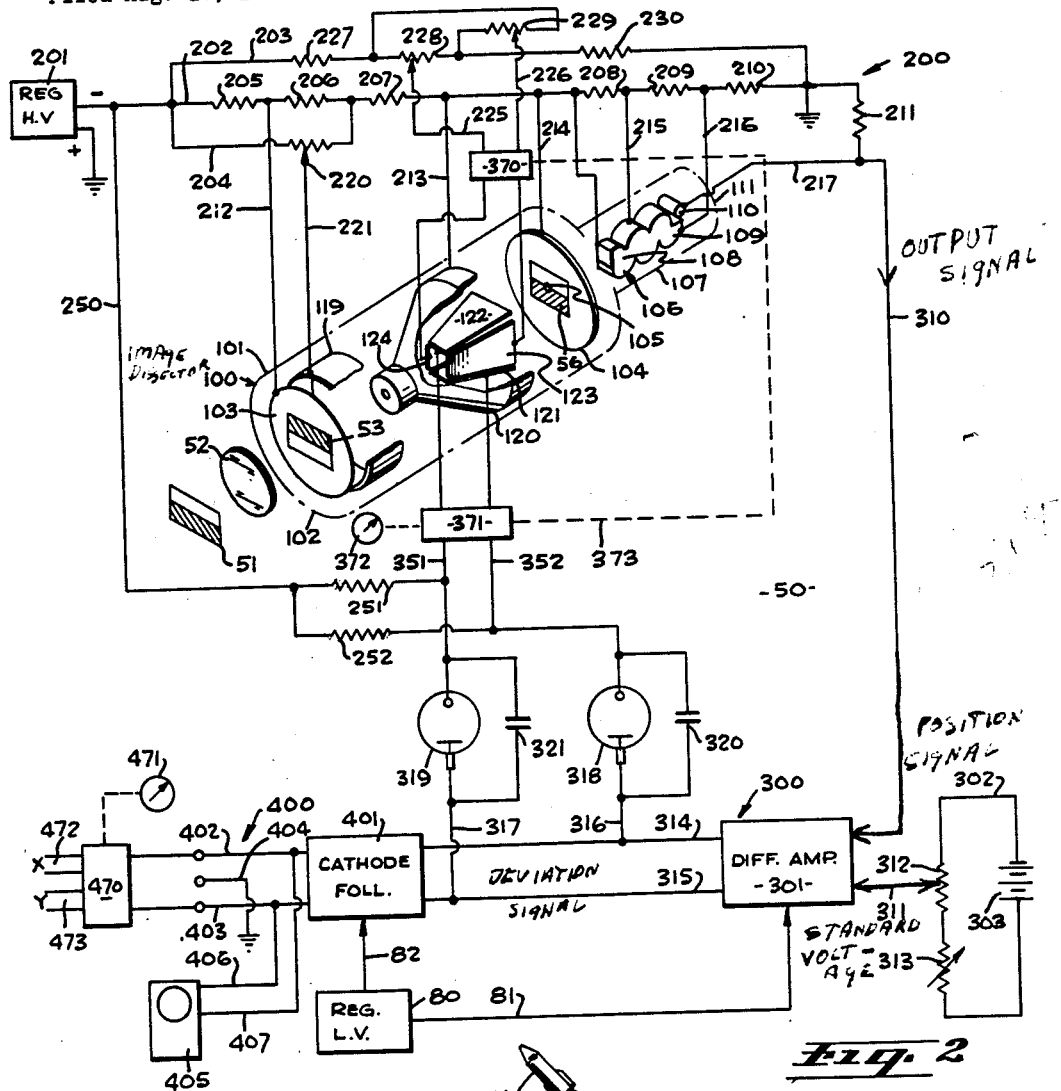
FIGURE 2 is a diagrammatic representation of the tube and circuit employed in the displacement signal subcomponent of the invention.

FIGURE 2 illustrates a displacement follower, such as that indicated generally by the numeral 14 in FIGURE 1.

The displacement follower of FIGURE 2 may be identified for purposes of reference by the numeral 50.

Its principal component parts will be identified by three digit numbers, so that all parts thereof can be numbered in the same centennial series.

The displacement follower 50 will be seen to be comprised principally of the following:

A tube of the image dissector type 100
Tube element circuitry: for supplying operating potentials or other controls, other than deflection control, to tube 100, 200
Deflection circuitry for controlling the deflection of the electron beam within tube 100, 300
Output circuitry for converting the deflection voltage to a suitable output voltage for recording, signaling, or controlling a servo system, 400

In FIGURE 2, an image dissector tube indicated generally by the numeral 100 has its component parts enclosed in the usual evacuated glass envelope 101. The viewing end 102 of the tube is provided with a photo-cathode 103, ordinarily a coating on the inside surface of the glass envelope 101, which emits electrons in a beam which is the electron equivalent of a light image perceived by the photo-cathode 103.

Potentials of the various elements of the tube 100 are arranged in the manner to be described hereinafter so that the electron beam produced at photo-cathode 103 moves downstream approximately along the axis of envelope 101 to an image shield 104, which is substantially impenetrable to the electron stream except at a central aperture 105. Aperture 105 may be a perfectly round hole co-axial with the axis of tube 100, as illustrated in FIGURE 2, but it will be understood that apertures of special shape may be employed in particular applications of the invention without departing from its spirit. For example, the aperture 105 may be star shaped, may be provided with a plurality of radial openings, or may be a grid or tissue, which increases in density from a minimum density at the center to a gradually increasing density radially outwards in all directions.

An electron multiplier 106 is housed in the neck 107 of the tube 100 downstream from the image shield 104. Any part of the electron stream from photo-cathode 103 which passes through the aperture 105 is caught in the first dynode 108 of photo-multiplier 106, and a substantially amplified electron signal from the downstream dynode 109 of the photo-multiplier impinges upon an anode 110.

The downstream end of the tube 100 is capped with a multiple pin plug cap 111. The pins of cap 111 provide connection means for the dynodes of the electron multiplier 106, and also a connection to the anode 110. These many wires are not shown since they would merely clutter the diagram, and merely provide a potential gradient to the successive dynodes in the electron multiplier 106 all according to the usual construction of electron multipliers familiar to those skilled in this art, and are not a point of novelty in this invention.

The electron beam which passes from photo-cathode 103 to image shield 104 during the operation of tube 100 passes through a focusing electrode 119, an accelerating anode 120, and deflection plates 121 to 124 inclusive, lower and upper deflection plates 121 and 122 being identified as X deflection plates, and right and left deflection plates 123 and 124 (looking downstream) as the Y deflection plates.

The longitudinal sectional view of FIGURE 4, which reveals the interior components of the tube in greater detail also reveals the disposition of the tube elements 119 to 124 with respect to the electron beam, and also the manner in which they are supported.

The viewing end 102 of the tube 100 is seen to be spherical in shape, with the inner surface concave and symmetrical about the longitudinal axis of the tube 100, which may be referred to as the Z axis, or the bore sight axis, in relation to transverse X and Y axis at which deflecting potential can be applied by deflection plates 121 to 124.

The photocathode 103 occupies only the central area of viewing end 102, in the vicinity of the Z axis, but it is part of an electrically extended coating 130 which lines almost the entire upstream interior of glass envelope 101.

An external contact 131 extends through the wall of envelope 101 to the electrically conductive coating 130, and through it, to the photocathode 103, so as to provide a means for establishing the potential of photocathode 103.

Focusing electrode 119 is supported within envelope 101 by a plurality of studs 132 and 133 which extend through the side walls of envelope 100 to external contacts 134 and 135, respectively.

The accelerating anode 120 is likewise supported by a plurality of studs 136 and 137 which pass through the side walls of glass envelope 101 to external contacts 138 and 139, respectively.

The deflection plates 121 to 124 are supported within the glass envelope 101 by means of similar stud and external contact means, which provide both support means for the deflection plates and a means for connecting them to the external control circuit. In FIGURE 4, only the stud and contact members for the vertical or X direction deflection plates are illustrated, but it will be understood that the plates 123 and 124 are supported in substantially the same manner. It is seen that plates 121 and 122 are supported on studs 140 and 141, which pass through the walls of accelerating anode 120 and the walls of the glass envelope 101 to external contacts 142 and 143, respectively. The studs 140 and 141 are encircled with insulating sleeves 144 and 145, so that the accelerating anode 120 is insulated from electrical contacts with the potentials applied to deflection plates 121 and 122 by way of contacts 143 and 142.

The electron image formed at photocathode 103 in correspondence with the light image perceived by the photocathode, is projected downstream on the image shield 104 in a manner analogous to optical projection. Electrons emerging from each of the various points of the photocathode 103 travel along paths which pass through a region adjacent a cross-over point 146 and from there come to a focus at a corresponding point on the upstream face of the image shield 104. Thus an optical image of the object 51 formed by the lens 52 on the photocathode 103 is transformed at the photocathode into a electron image and this electron image is focused on the image shield 104. Broadly speaking electrons travel within a converging cone indicated by the dashed lines 145 to a region in the neighborhood of the crossover point 146 and from there they travel in a diverging cone indicated by the dashed lines 147 to appropriate focal points on the image shield 146.

FIGURE 2 shows a diagrammatic perspective view of optical and equivalent electronic images. An optical target 51, such as the boundary line 12 between a missile and its tail of rocket flames, is observed through a telescope indicated diagrammatically by the lens 52. The telescope lens 52 projects an inverted light image 53 on photocathode 103. Photocathode 103 emits an electron beam 54, indicated in FIGURE 4 by the space within cone 145, which converges to the cross-over point 146 and then diverges as an inverted electron beam 55 in the space indicated in FIGURE 4 within the cone 147 downstream from cross-over point 146, and thus projects an electron image 56 (see FIGURE 2) on image shield 104. It so happens in the particular embodiment illustrated in FIGURE 2 that the electron image 56 is upright and corresponds in disposition to that of the target 51 itself. However, it will be obvious that various optical systems might produce a different number of inversions, without diminishing the utility of the invention.

The image which the tube perceives is merely a boundary line or boundary area between two different degrees of light intensity. The boundary need not be between the perfect white and black region, and it need not be perfectly defined; it is only necessary that there be a target discontinuity (in light of the wave lengths being detected by the photocathode) to produce sufficient discontinuity in the electron image 56 to permit discrimination by the displacement follower 50 between different positions of the electron image 56.

The image dissector tube 100 is employed only to indicate the proportions of black and white of the target discontinuity which fall upon the aperture 105. Electrons from the electron image which pass through aperture 105 are collected in the first dynode 108 of electron multiplier 106, and the electron stream so collected is vastly amplified by passage through the twelve dynodes of electron multiplier 106, emerging from the downstream dynode 109 to produce a signal at anode 110.

FIGURE 3 illustrates graphically how the voltage output at anode 110 indicates the position of the discontinuity between light and dark areas of electron image 56, to the extent that said discontinuity is projected on aperture 105. In FIGURE 3, the vertical co-ordinate 60 indicates the excess of the voltage output above the voltage output produced by a part of the electron image 56 corresponding to an all dark region of target 51, i.e., when target 56 as viewed in FIGURE 2 has risen sufficiently high on the image shield 104 so that the boundary line is somewhere above the aperture 105.

The horizontal co-ordinate 61 in FIGURE 3 indicates the deflection in an X direction (i.e., vertically) of the electron image 56 from a perfectly centered or Z axis position when the discontinuity in the image 56 is exactly across the center of the aperture 105 with its upper half all light and its lower half all dark.

In FIGURE 3, six different deflections of the electron image boundary 56, as seen by the aperture 105, are illustrated just below their corresponding deflection reading on co-ordinate 61, by the aperture views 62, 63, 64, 65, 66, and 67. Deflections 63 to 66 lie between the boundary lines of all dark and all light, indicated by the vertical lines 68 and 69 respectively. In these positions, the target is said to be "captured." When the displacement follower is operating with the target captured, the voltage appearing on the lines 314 and 315 at the output of the differential amplifier and hence the voltage appearing on the lines 402 and 403 at the output of the cathode follower 401 is substantially proportional to and hence is a measure of the angular deviation of the target from the longitudinal axis Z of the displacement follower.

On the other hand, the target is said to have moved out of "capture" in cases illustrated by circles 62 and 67, since the discontinuity has moved out of sight and deflection cannot be detected.

Thus, for any position of the target so high that the deflection as indicated on co-ordinate axis 61 lies to the left of the all dark co-ordinate 68, as illustrated in 62, there is no voltage whatever above the predetermined zero point (the all dark reading), and there is no change in voltage no matter how extensively the target 51 may move in a region in which the aperture sees only the all dark area 62. Similarly, in the other extreme of deflection, if the target 56 moves down so far that the boundary line discontinuity is lost to view of the aperture 105, presenting the aperture with an all light view as indicated at 67, there is a constant high voltage output regardless of how much the target moves, as long as it moves to the right of the all light deflection co-ordinate 69.

The displacement follower can function to detect displacement of the target only when the target is captured, i.e., when the portion of the electron image 56 which is perceived through the aperture 105 presents a discontinuity between light and dark, as it does for deflections between the all dark co-ordinate 68 and the all light co-ordinate 69. In this intermediate region, the voltage output at anode 110 varies over a curve indicated by the numeral 70, rising rapidly in the nearly all dark region 71 and flattening out to asymptotically approach the maximum voltage output in the nearly all light region 72.

It will be evident from FIGURE 3 that changes in deflection of the electron image 56 can be detected only in the region of the curve 70, in which changes in deflection produce a change in voltage output along the gradient along the curve 70. Moreover, it will be evident that most sensitive operation of the curve is achieved in the region of the curve 70 in which the gradient is steepest, namely, in the region 71 in which most of the electron image 56, as perceived by the aperture 105, is dark thus producing a huge change in voltage output for a slight deflection. Thus, a deflection from aperture view 63 to aperture view 64, on the steeper part of curve 70, while the aperture view is mostly dark, multiplies the voltage by about twice. On the other hand, when the aperture views a predominantly light image as in the case of aperture views 65 and 66, an equal change in deflection only produces a five or ten percent change (for example) in the voltage output which is detected by anode 110.

In various forms of the invention, the displacement follower 50 may be assisted in detecting the desired target discontinuity. In the simplest case, when the displacement follower is watching a nearby test specimen, the target will be illuminated to a greater brightness than any background illumination which might distract or confuse it. In other cases, filters may be employed for rejecting unwanted radiation from the environment of a distant target. Two displacement follower tubes 100 may be used in parallel for continuously watching the target with a different number of inversions in their optical systems, so that one watches the target with black below, while the other watches the target with black above, thus to some degree compensating for the decline in sensitivity between portion 71 and portion 72 of curve 70 in FIGURE 3.

It will also be obvious to those skilled in the art that the invention comprehends all applications in which the target has a discontinuity detectible by the image dissector tube. The target may be one which emits or reflects light or absorbs light sufficiently to be distinguished from its environment, or it may have a detectible discontinuity in emission from two areas within view of the image dissector tube 100. The device may be employed with any type of emissive cathode, not only cathodes responsive to electromagnetic waves in the usual range of light visible to the naked eye. The terms, "photocathode" and "optical image" are used herein to refer to all instances in which a cathode is caused to emit electrons by the impingement of electromagnetic waves, even waves approaching or classified as microwaves, or infrared light, or at the opposite end of the spectrum, ultraviolet light.

No particular mode of support or external connection is shown for the image shield 104 or the dynodes of electron multiplier 106, since these may be supported in any manner known to those skilled in the art, and the connection therefor brought out in any convenient manner; for example, in the embodiment illustrated in FIGURES 2 and 4, electrical connections to the dynodes of electron multiplier 106, the image shield 104, and the anode 110, would most conveniently be connected to circuits external to the glass envelope 101 through the multiple pin plug 111.

Many important features of novelty will be noted in the particular embodiment of the image dissector tube illustrated in FIGURE 4.

The accelerating anode 120 is shown in a preferred construction, with an upstream end 120a substantially spherical and concentric with the spherical photocathode 103, and a diverging conical portion 120b downstream from the focal point 146. The substantially spherical upstream end 120a causes the electrostatic field between the photocathode 103 and upstream end 120a to be so distributed as to accelerate the electrons in the electron beam 54 downstream towards focal point 146.

The downstream conical portion 120b diverges at a greater angle than the downstream electron beam 55, to accommodate the divergence of the downstream electron beam 55 and the divergence of its enveloping deflection plates 121 to 124 inclusive.

Preferably, also, the deflection plates are disposed around the loci of downstream electron beam 55 in a diverging arrangement as shown, with a greater angle of divergence than that of the beam itself, so that its sufficient beam controlling electrostatic field may be brought to bear on downstream electron beam 55, without interfering with its deflection, in the embodiments in which deflection of substantial amount is desired. Also, it will be appreciated that the particular boundary which it is desired to perceive in the optical image 51 may not lie exactly at the Z-axis. Indeed, for ease of capture, some initial deflection of downstream electron beam 55 may not be necessary in order to place the discontinuity boundary in the best operating position as indicated by the aperture illustration 63 in FIGURE 3.

In the displacement follower 50 illustrated in FIGURE 2, the elements of the image dissector tube 100 are maintained at operating potentials, generally increasing over a very wide voltage range from the lowest potential at the upstream photocathode 103 to the highest potential at the downstream output anode 110, by means of the voltage dividing network 200, upon which a regulated high voltage is imposed by regulated high voltage source 201. The network of FIGURE 2, shown by way of example only, consists primarily of a stepped rising potential line 202, a deflection plate line 203, and a focusing potentiometer 204, circuit elements 202, 203 and 204 being connected in a parallel relationship as illustrated.

The stepped potential line 202 is comprised of a number of resistances 205, 206, 207, 208, 209, 210, and 211, connected in series, and tapped for increasing potential steps to successive elements of image dissector tube 100 by circuit connection lines 212, 213, 214, 215, 216, and 217. Focusing adjustment of the focusing anode 119 is accomplished by means of focusing potentiometer 220, in circuit element 204, connection to focusing electrode 119 being by way of line 221.

Horizontal positioning of the electron beam 55 is accomplished by the voltage imposed on Y deflection plates 123 and 124 through lines 225 and 226 to the circuit element 203, which contains resistances 227, 228, 229, and 230, resistances 228 and 229 being adjustable to provide adjustment of Y deflection plates 124 and 123 respectively.

It will be noted that lines 225 and lines 226 pass through a rectangle indicating a switching means 370 to be described hereinafter.

The X deflection plates 121 and 122 are supplied with a constant initial electrostatic potential from regulated high voltage supply 201 by way of line 250, and resistances 251 and 252 which connect to lines 351 and 352 leading through a switching means 371, to be described hereinafter, to the X deflection plates 121 and 122.

The position of the downstream electron beam 55 is controlled in the vertical or X deflection direction of FIGURE 2 by the sum of the voltages supplied through resistances 251 and 252, and a deflection voltage supplied through a deflection control circuit indicated generally by the numeral 300, and comprised principally of a differential amplifier 301, and an initial target position voltage source 302.

A regulated low voltage power source 80 supplies power to differential amplifier 301 through line 81. The initial target position voltage means 302 is shown as having its own voltage source 303, but it will be understood that this voltage might also be derived from the regulated low voltage source 80.

The differential amplifier 301 compares two input voltages detected by it: first, the output voltage of the image dissector tube, produced by electrons impinging upon anode 110, and delivered to the differential amplifier 301 by way of line 310; and secondly, the initial target voltage received from the initial target position voltage source 302 by way of line 311. The initial target detection voltage is adjustable by two potentiometer means, a rough adjustment potentiometer 312, and a fine adjusting potentiometer 313.

After initial adjustment of initial target position voltage source 302, at the time of capture of the electron image 56 on aperture 105, the differential amplifier 301 produces no signal except when some differential occurs between the voltages delivered to it over lines 310 and 311, from the image dissector tube 100 and the initial voltage source 302, respectively. Any minute deflection of the electron image 56, however, causes differential amplifier 301 to produce a greatly amplified output voltage on output lines 314 and 315, which output voltage is transmitted to the X deflection plates 121 and 122 through lines 316 and 317, corona discharge tubes 318 and 319, lines 352 and 351, and switching means 371. Capacitors 320 and 321 are provided in parallel with corona discharge tubes 318 and 319, respectively.

The same output potential of differential amplifier 301 which is used to control the deflection of X deflection plates 121 and 122 is also delivered to an output circuit indicated generally by the numeral 400, and comprised principally of cathode follower 401, which may be supplied with its power from the regulated low voltage source 80 through line 82.

The output of the cathode follower 401, delivered by lines 402 and 403, is preferably symmetrical with a central ground tap 404, as will be explained hereinafter in connection with FIGURE 5. An oscilloscope 405 is shown connected across the output lines 402 and 403 by way of lines 406 and 407, since this instrument can be usefully employed by an operator to detect when he has achieved and when he has lost capture of the electron image 56 in a desired position on the image shield 104, in the vicinity of the image aperture 105.

The output lines 402 and 403 may also be connected to a servo-controlled gimbal mounting mechanism for the displacement follower 50, as described in connection with FIGURE 1, or for recording deflection against time.

In a specific embodiment of FIGURE 2, the displacement follower 50 is shown as provided with a commutator 470, which may be cyclically driven by a time clock means 471 to produce timed alternate connection to separate X and Y output circuits 472 and 473.

A time clock means 372 is adapted to be driven in synchronism with clock 471, and to cyclically switch switch means 370 and 371 to make timed sequence interchange of electrostatic connections to the X and Y deflection plates. The switch means 371 and 370 may be combined in a single gang switch system, according to means well known to those skilled in the art of such high voltage switching, and indicated diagrammatically by dashed line 373.

It will be appreciated that the automatic sequencing produced by switches 370 and 371, and commutator switch 470 may be disconnected and the switches controlled manually for operator-selected moments of X of Y readings of deflection on oscilloscope 405 or other recording means. In many instances, such as vibration testing, strength of materials testing, etc., deflection in only one direction at a time is all that is desired, and the sequential switching means may be dispensed with entirely.

Figure 5:
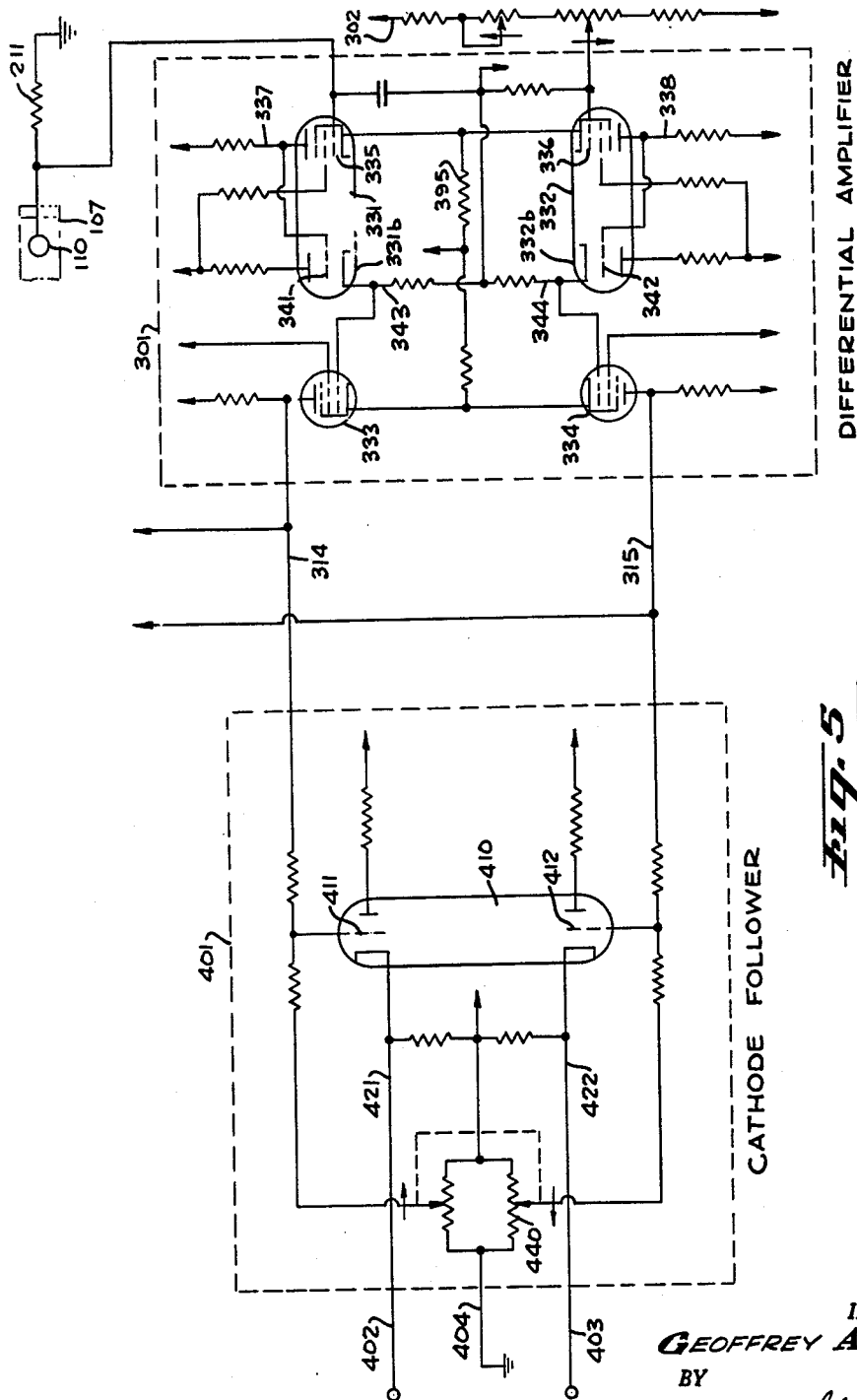
FIGURE 5 is a circuit diagram of one embodiment of the invention showing construction of a circuit in sufficient detail to enable one skilled in the art to construct a circuit suitable for the present invention.

The circuit design of the differential amplifier 301 and the cathode follower 401 is illustrated in some detail in FIGURE 5.

The initial target voltage source 302 is shown at the right of differential amplifier 301. The differential amplifier 301, in the particular embodiment illustrated, is a symmetrical circuit arrangement of a pair of tubes 331 and 332, and a pair of output tubes 333 and 334.

Cathode follower 401 employs a dual tube 410 with a dual adjustment output resistance system 440.

The two voltages being compared in the differential amplifier 301, namely the deflection voltage on line 310, and the initial target position voltage on line 311 are imposed on the control grids 335 and 336 of tubes 331 and 332, which are cathode coupled by the common cathode resistor 345. The voltage difference between lines 337 and 338 is, thereby, a direct function of the difference of the two input signals, respectively. The resultant cathode flow through cathode lines 337 and 338 established a potential at triode section 331*b* and 332*b* on the grids 341 and 342 respectively. Cathode line flow in lines 343 and 344 establishes the grid potentials for amplifier tubes 333 and 334, which establish the potentials in lines 314 and 315, and if there is any change in the difference, a change in the deflection on the X deflection plates 121 and 122 within the tube 100.

The cathode follower 401 utilizes the dual potentiometer 440 for simultaneously lowering the bias voltage of one grid in 410 while raising the bias voltage of the other grid, thus producing an output on lines 402 and 403 which is symmetrical with respect to ground voltage 404, regardless of the input voltage coming in on lines 314 and 315 from the differential amplifier 301.

Changes in the grid voltage of the grids 411 and 412 produces a cathode follower current in the cathode lines 421 and 422, at low voltage and substantial flow, suitable for a low impedance load on lines 402 and 403.

The perspective view of FIGURE 6 and its associated FIGURES 6*a* and 6*b* illustrate an alternative form of the invention in which a two-dimensional target may be followed continuously in X and Y displacement.

Displacement follower 85, which is substantially identical to the displacement follower 50 of FIGURE 2, includes an image dissector tube 86, like tube 100 illustrated in FIGURES 2 and 4. However, means are used for imposing a continuously moving deflection of downstream electron beam 55 on a circular path over the face of image shield 104. In the particular embodiment illustrated, this means is established and timed by timing device 88 in field current lines 89 and 90.

The aperture employed in aperture shield 104 in connection with the continuously moving electron image beam 55 may be a perfectly round hole like aperture 105, with the boundary discontinuity moving around its axis, just within its peripheral edge. However, a preferred method of detecting deflection by quadrants will employ an aperture like aperture 91 illustrated in FIGURE 6*a*, in which radial slots, or other radial discontinuities, indicated at 92, present a pulsing of the electron current transmitted to the first dynode 108 as the electron beam is caused to precess in its circular jiggling or dancing movement indicated by the dashed line 93. Even though the slots 92 are of constant width, displacement of the path 93 of the image movement from a perfectly central position, will alter the quantity of electrons passed by the radial slots of each quarter, so that the displacement of the axis of the moving electron image, from a position coaxial with slot 91, can be read for each quarter by timing the reading thereof, by means of timing device 471 to coincide with the position of the beam for each quarter in succession.

Another type of aperture for use with the moving image system of FIGURE 6 is illustrated in FIGURE 6*b*. It is the purpose of the aperture 95 in FIGURE 6*b* to present an aperture which increases radially in density of the barrier presented to electrons in the image moving along dashed line circular path 96. It will be seen, that as long as the axis of the electron beam 55 is coaxial with aperture 95, a direct current signal will be produced at anode 110. On the other hand, in the case of any deflection of the axis of the beam 55 from the Z axis position, a sine wave signal will be received, and the phasing of this sine wave signal can be employed to determine, in connection with the clock timing devices of elements 88 and 471, the direction of deflection of the axis of the path of travel 96.

In some instance it may be preferred that differential amplifier 301 compare A.C. signals, instead of direct current signals. It may be arranged for the voltage source 302 to be an A.C. signal source by any means well known to those familiar with the art of electronic circuitry. The voltage output at anode 110 in the image dissector tube of FIGURE 4 may be converted from a D.C. signal to an A.C. signal by bringing a photocathode grid 160 into operation. Photocathode grid 160 is located in the path of the electron beam 54 downstream from photocathode 103, and is connected to an external pulsing potential of suitable value through line 161, which passes through the glass wall of envelope 101, and coating 130, by way of an insulating bushing 162.

It will be appreciated that the higher the gain in the differential amplifier the less will be the slight deviation of the electron image from the preset position at the dissecting aperture, and the smaller will be the difference between the multiplier anode voltage and the constant standard capture voltage. Also, the sharper the discontinuity in light between the light and dark areas which produce the discontinuity image of electrons at the dissecting aperture, the smaller will be the difference between multiplier anode voltage and constant capture voltage required to retain the electron image substantially at the dissecting aperture, and the smaller will be the slight departure of the electron image from perfect alignment with the preset location at the electron aperture.

While the invention has herein been shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices.

Having thus described the invention, what is new in support of Letters Patent is:

1. A displacement follower which includes: an image dissector tube having a photocathode, a focusing electrode, and an image shield with a dissecting aperture, all disposed along a longitudinal Z-axis defining the region of the path of an electron beam from said photocathode to said image shield, and an electron multiplier downstream from said dissecting aperture, whereby an optical image falling on said photocathode may be reproduced as an electron image projected on said image shield in the region of said dissecting aperture; an accelerating anode disposed around the cross-over point of said electron beam and having a restricting aperture on said Z-axis upstream from said cross-over point; a source of regulated voltage and a voltage dividing network adapted to establish operating potentials at the elements of said image dissector tube and of said electron multiplier; a pair of deflection plates disposed on opposite sides of said Z-axis between said focal point and said image shield deflection of said electron beam to compensate when said optical image departs frm its initial position on said photocathode; voltage sources integral with said voltage divider network to establish static potentials for said deflection plates; a capture voltage source for adjustably selecting a capture voltage corresponding to the voltage output of said electron multiplier for an initial target position; a differential amplifier connected to said electron multiplier output and said capture voltage source to produce a signal corresponding to the difference between said capture voltage and said electron multiplier output; and means for connecting the output of said differential amplifier to one pair of said deflection plates to superimpose the output voltage of said differential amplifier upon said deflection plate static voltage, thereby substantially retaining the location of said electron image upon said dissecting aperture, regardless of displacement of said optical image upon said photocathode.

2. A displacement follower which includes: an image dissector tube having a substantially spherical photocathode, a focusing electrode, and an image shield with a dissecting aperture, all disposed along a longitudinal Z-axis defining the region of the path of an electron beam from said photocathode to said image shield, and an electron multiplier downstream from said dissecting aperture, whereby an optical image falling on said photocathode may be reproduced as an electron image projected on said image shield in the region of said dissecting aperture; an accelerating anode disposed around the cross-over point of said electron beam and having a restricting aperture on said Z-axis upstream from said cross-over point, said accelerating anode having a convex upstream anode surface shaped to establish a field pattern for converging electron travel from said photocathode; an electrically shielding anode support of conical shape disposed on said Z-axis and supporting said accelerating anode, said anode support diverging to an enlarged base opening toward said image shield; a source of regulated voltage and a voltage dividing network adapted to establish operating potentials at the elements of said image dissector tube and of said electron multiplier; deflection plates disposed at least partially within said conical anode support, said plates being arranged into mating opposite pairs, one pair for transverse X-axis deflection, and one pair for transverse Y-axis deflection, and said plates being arranged to diverge from their upstream to their downstream ends at an angle of divergence greater than the angle of divergence of said electron beam from said focal point, to maintain a diverging envelope around said electron beam throughout its range of transverse displacement as it diverges downstream toward said dissecting aperture; adjustable voltage sources integral with said voltage divider network to establish static potentials for said X and Y deflection plates; a capture voltage source for adjustably selecting a capture voltage corresponding to the voltage output of said electron multiplier for an initial target position; and differential amplifier means connected to said electron multiplier output and said capture voltage source to produce a signal proportional to the difference between said capture voltage and said electron multiplier output for addition to one of said deflection plate static voltages, thereby substantially retaining the location of said electron image upon said dissecting aperture, regardless of displacement of said optical image upon said photocathode.

3. A displacement follower which includes: an image dissector tube having a substantially spherical photocathode, a focusing electrode, and an image shield with a dissecting aperture, all disposed along a longitudinal Z-axis defining the region of the path of an electron beam from said photocathode to said image shield, and an electron multiplier downstream from said dissecting aperture, whereby an optical image falling on said photocathode may be reproduced as an electron image projected on said image shield in the region of said dissecting aperture; a grid means disposed in the path of said electron beam within said image dissector tube; a source of alternating electrical potential for periodically changing the potential on said grid means whereby said electron beam passes to said image shield in pulses and the output of said electron multiplier is an alternating voltage; an accelerating anode disposed around the cross-over point of said electron beam and having a restricting aperture on said Z-axis upstream from said cross-over point, said accelerating anode having a convex upstream anode surface shaped to establish a field pattern for converging electron travel from said photocathode; an electrically shielding anode support of conical shape disposed on said Z-axis and supporting said accelerating anode, said anode support diverging to an enlarged base opening toward said image shield; a source of regulated voltage and a voltage dividing network adapted to establish operating potentials at the elements of said image dissector tube and of said electron multiplier; deflection plates disposed at least partially within said conical anode support, said plates being arranged within said conical anode support, said plates being arranged into mating opposite pairs, one pair for transverse X-axis deflection, and one pair for transverse Y-axis deflection, and said plates being arranged to diverge from their upstream to their downstream ends at an angle of divergence greater than the angle of divergence of said electron beam from said focal point, to maintain a diverging envelope around said electron beam throughout its range of transverse displacement as it diverges downstream toward said dissecting aperture; adjustable voltage sources integral with said voltage divider network to establish static potentials for said X and Y deflection plates; a capture voltage source for adjustably selecting a capture voltage corresponding to the voltage output of said electron multiplier for an initial target position; a differential amplifier connected to said electron multiplier output and said capture voltage source to produce a signal proportional to the difference between said capture voltage and said electron multiplier output; and a pair of corona discharge tubes for connecting the output of said differential amplifier to one pair of said deflection plates to superimpose the output voltage of said differential amplifier upon said deflection plate static voltage, thereby substantially retaining the location of said electron image upon said dissecting aperture, regardless of displacement of said optical image upon said photocathode.

4. A displacement follower which includes: an image dissector tube having a substantially spherical photocathode, a focusing electrode, and an image shield with a dissecting aperture, all disposed along a longitudinal Z-axis defining the region of the path of an electron beam from said photocathode to said image shield, and an electron multiplier downstream from said dissecting aperture, whereby an optical image falling on said photocathode may be reproduced as an electron image projected on said image shield in the region of said dissecting aperture; an accelerating anode disposed around the cross-over point of said electron beam and having a restricting aperture on said Z-axis upstream from said cross-over point, said accelerating anode having a convex upstream anode surface shaped to establish a field pattern for converging electron travel from said photocathode; an electrically shielding anode support of conical shape disposed on said Z-axis and supporting said accelerating anode, said anode support diverging to an enlarged base opening toward said image shield; a source of regulated voltage and a voltage dividing network adapted to establish operating potentials at the elements of said image dissector tube and of said electron multiplier; deflection plates disposed at least partially within said conical anode support, said plates being arranged into mating opposite pairs, one pair for transverse X-axis deflection, and one pair for transverse Y-axis deflection, and said plates being arranged to diverge from their upstream to their downstream ends at an angle of divergence greater than the angle of divergence of said electron beam from said focal point, to maintain a diverging envelope around said electron beam throughout its range of transverse displacement as it diverges downstream toward said dissecting aperture; adjustable voltage sources integral with said voltage divider network to establish static potentials for said X and Y deflection plates; a capture voltage source for adjustably selecting a capture voltage corresponding to the voltage output of said electron multiplier for an initial target position; a differential amplifier connected to said electron multiplier output and said capture voltage source to produce a signal proportional to the difference between said capture voltage and said electron multiplier output; a pair of corona discharge tubes for connecting the output of said differential amplifier to one pair of said deflection plates to superimpose the output voltage of said differential amplifier upon said deflection plate static voltage, thereby substantially retaining the location of said electron image upon said dissecting aperture, regardless of displacement of said optical image upon said photocathode; and a cathode follower means for producing an output signal corresponding to the output of said differential amplifier but isolated therefrom and transformed to a lower impedance.

5. A displacement follower which includes: an image dissector tube having a photocathode, a focusing electrode, and an image shield with a dissecting aperture, all disposed along a longitudinal Z axis defining the region of the path of an electron beam from said photocathode to said image shield, and an electron multiplier downstream from said dissecting aperture, whereby an optical image falling on said photocathode may be reproduced as an electron image projected on said image shield in the region of said dissecting aperture; shielding means over at least part of said aperture to present a plurality of shielding densities to said electron image; an accelerating anode disposed around the cross-over point of said electron beams and having a restricting aperture on said Z axis upstream from said cross-over point; a source of regulated voltage and a voltage dividing network adapted to establish operating potentials at the elements of said image dissector tube and of said electron multiplier; a pair of deflection plates disposed on opposite sides of said Z axis between said focal point and said image shield deflection of said electron beam to compensate when said optical image departs from its initial position on said photocathode; voltage sources integral with said voltage divider network to establish static potentials for said deflection plates; a capture voltage source for adjustably selecting a capture voltage corresponding to the voltage output of said electron multiplier for an initial target position; a differential amplifier connected to said electron multiplier output and said capture voltage source to produce a signal proportional to the difference between said capture voltage and said electron multiplier output; means for connecting the output of said differential amplifier to one pair of said deflection plates to superimpose the output voltage of said differential amplifier upon said deflection plate static voltage, thereby substantially retaining the location of said electron image upon said dissecting aperture, regardless of displacement of said optical image upon said photocathode; and means for imposing cyclical movement of said electron image over said dissecting aperture, whereby the plurality of densities of the latter produce a periodic output signal from said tube.

6. A displacement follower which includes: an image dissector tube having a substantially spherical photocathode, a focusing electrode, and an image shield with a dissecting aperture, all disposed along a longitudinal Z axis defining the region of the path of an electron beam from said photocathode to said image shield, and an electron multiplier downstream from said dissecting aperture, whereby an optical image falling on said photocathode may be reproduced as an electron image projected on said image shield in the region of said dissecting aperture; an accelerating anode coaxial with said Z axis, and comprised of a cylindrical portion extending downstream from said focal point and a substantially spherical upstream end substantially concentric with said photocathode, and said spherical end being provided with a restricting aperture concentric with said Z axis; an electrically shielding anode support in the form of a truncated cone coaxial with said accelerating anode, and diverging from the downstream end thereof toward the side walls of said tube and supported at said side walls at its downstream end; a source of regulated voltage and a voltage dividing network adapted to establish operating potentials at the elements of said image dissector tube and of said electron multiplier; four deflection plates disposed at least partially within said conical anode support, said plates being arranged into mating opposite pairs, one pair for transverse X axis deflection, and one pair for transverse Y axis deflection, and said plates being arranged to diverge from their upstream to their downstream ends at an angle of divergence great enough to clear said electron beam at its maximum deflection angle; voltage sources integral with said voltage divider network to establish a pair of static potentials suitable for said X and Y deflection plates; a capture voltage source for adjustably selecting a capture voltage corresponding to the voltage output of said electron multiplier for an initial target position; a differential amplifier for comparing said electron multiplier output and said capture voltage to produce a signal which is proportional to the difference, and which is amplified to produce a beam deflection sufficient to restore said electron image substantially to its initial target position; a pair of corona discharge tubes for adding the output of said differential amplifier to one of said pair of deflection plate potentials, to produce a potential for restoring said electron image substantially to its initial target position; a cathode follower means for producing an output signal corresponding to the output of said differential amplifier but isolated therefrom and transformed to a lower impedance; and a voltage dividing network associated with said cathode follower means.

7. A displacement follower which includes: an image dissector tube having a substantially spherical photocathode, a focusing electrode, and an image shield with a dissecting aperture, all disposed along a longitudinal Z axis defining the region of the path of an electron beam from said photocathode to said image shield, and an electron multiplier downstream from said dissecting aperture, whereby an optical image falling on said photocathode may be reproduced as an electron image projected on said image shield in the region of said dissecting aperture; an accelerating anode coaxial with said Z axis, and comprised of a cylindrical portion extending downstream from said cross-over point and a substantially spherical upstream end substantially concentric with said photocathode, and said spherical end being provided with a restricting aperture concentric with said Z axis; an electrically shielding anode support in the form of a truncated cone coaxial with said accelerating anode, and diverging from the downstream end thereof to relatively close spacing from the side walls of said tube; a source of regulated voltage and a voltage dividing network adapted to establish operating potentials at the elements of said image dissector tube and the dynodes of said electron multiplier; four deflection plates disposed at least partially within said conical anode support, said plates being arranged into mating opposite pairs, one pair for transverse X axis deflection, and one pair for transverse Y axis deflection, and said plates being arranged to diverge from their upstream to their downstream ends at an angle of divergence great enough to clear said electron beam at its maximum deflection angle; voltage sources integral with said voltage divider network to establish a pair of static potentials suitable for said X and Y deflection plates; a capture voltage source for adjustably selecting a capture voltage corresponding to the voltage output of said electron multiplier for an initial target position; a differential amplifier for comparing said electron multiplier output and said capture voltage to produce a signal which is proportional to the difference, and which is amplified to produce a beam deflection sufficient to restore said electron image substantially to its initial target position; a pair of corona discharge tubes for adding the output of said differential amplifier to one of said pair of deflection plate potentials, to produce a potential for restoring said electron image substantially to its initial target position; and switch means between said deflection plates and their associated circuits, which pair of said deflection plates shall receive said restoring potential and the polarity at which said restoring potential shall be applied to said plates.

8. A displacement follower which includes: an image dissector tube having a substantially spherical photocathode, a focusing electrode, and an image shield with a dissecting aperture, all disposed along a longitudinal Z axis defining the region of the path of an electron beam from said photocathode to said image shield, and an electron multiplier disposed along said Z axis downstream from said dissecting aperture, whereby an optical image falling on said photo-cathode may be reproduced as an electron image projected on said image shield in the region of said dissecting aparture; an accelerating anode coaxial with said Z axis, and comprised of a cylindrical portion extending downstream from said cross-over point and a substantially spherical upstream end substantially concentric with said photocathode, and said spherical end being provided with a restricting aperture concentric with said Z axis; an electrically shielding anode support in the form of a truncated cone coaxial with said accelerating anode, and diverging from the downstream end thereof toward the side walls of said tube; a source of regulated voltage and a voltage dividing network adapted to establish operating potentials at the elements of said image dissector tube and the dynodes of said electron multiplier; four deflection plates disposed at least partially within said conical anode support, said plates being arranged into mating opposite pairs, one pair for transverse X axis deflection, and one pair for transverse Y axis deflection, and said plates being arranged to diverge from their upstream to their downstream ends at an angle of divergence great enough to clear said electron beam at its maximum deflection angle; voltage sources integral with said voltage divider network to establish a pair of static potentials suitable for said X and Y deflection plates; a capture voltage source for adjustably selecting a capture voltage corresponding to the voltage output of said electron multiplier for an initial target position; a differential amplifier for comparing said electron multiplier output and said capture voltage to produce a signal which is proportional to the difference, and which is amplified to produce a beam deflection sufficient to restore said electron image substantially to its initial target position; a pair of corona discharge tubes for adding the output of said differential amplifier to one of said pair of deflection plate potentials, to produce a potential for restoring said electron image substantially to its initial target position; and a cathode follower means for producing an output signal corresponding to the output of said differential amplifier but isolated therefrom and transformed to a lower impedance.

9. A displacement follower which includes: an image dissector tube having a substantially spherical photocathode, a focusing electrode, and an image shield with a dissecting aperture, all disposed along a longitudinal Z axis defining the region of the path of an electron beam from said photocathode to said image shield, and an electron multiplier disposed along said Z axis downstream from said dissecting aperture, whereby an optical image falling on said photocathode may be reproduced as an electron image projected on said image shield in the region of said dissecting aperture; an electromagnetic shielding sleeve coaxial with said Z axis and shielding said dissector tube and said electron beam from external electromagnetic fields; an accelerating anode coaxial with said Z axis, and comprised of a cylindrical portion extending downstream from said focal point and a substantially spherical upstream end substantially concentric with said photocathode, and said spherical end being provided with a restricting aperture concentric with said Z axis; an electrically shielding anode support in the form of a truncated cone coaxial with said accelerating anode, and diverging from the downstream end thereof to the side walls of said tube at an angle larger than the maximum deflection angle of said electron beam; a source of regulated voltage and a voltage dividing network adapted to establishing operating potentials at the elements of said image dissector tube and the dynodes of said electron multiplier; four deflection plates disposed at least partially within said conical anode support, said plates being arranged into mating opposite pairs, one pair for transverse X axis deflection, and one pair for transverse Y axis deflection, and said plates being arranged to diverge from their upstream to their downstream ends at an angle of divergence great enough to clear said electron beam at its maximum deflection angle; voltage sources integral with said voltage divider network to establish a pair of static potentials suitable for said X and Y deflection plates; a capture voltage source for adjustably selecting a capture voltage corresponding to the voltage output of said electron multiplier for an initial target position; a differential amplifier for comparing said electron multiplier output and said capture voltage to produce a signal which is proportional to the difference, and which is amplified to produce a beam deflection sufficient to restore said electron image substantially to its initial target position; a pair of corona discharge tubes for adding the output of said differential amplifier to one of said pair of deflection plate potentials, to produce a potential for restoring said electron image substantially to its initial target position; a cathode follower means for producing an output signal corresponding to the output of said differential amplifier but isolated therefrom and transformed to a lower impedance; and means responsive to the output of said cathode follower means for controlling the position of the Z axis of said displacement follower.

10. A displacement follower which includes: an image dissector tube having a substantially spherical photocathode, a focusing electrode, and an image shield with a dissecting aperture, all disposed along a longitudinal Z axis defining the region of the path of an electron beam from said photocathode to said image shield, and an electron multiplier downstream from said dissecting aperture, whereby an optical image falling on said photocathode may be reproduced as an electron image projected on said image shield in the region of said dissecting aperture; an accelerating anode disposed around the cross-over point of said electron beam and having a restricting aperture on said Z axis upstream from said cross-over point, said accelerating anode having a convex upstream anode surface shaped to establish a field pattern for converging electron travel from said photocathode; an electrically shielding anode support of conical shape disposed on said Z axis and supporting said accelerating anode, said anode support diverging to an enlarged base opening toward said image shield; a source of regulated voltage and a voltage dividing network adapted to establish operating potentials at the elements of said image dissector tube and of said electron multiplier; deflection plates disposed at least partially within said conical anode support, said plates being arranged into mating opposite pairs, one pair for transverse X axis deflection, and one pair for transverse Y axis deflection, and said plates being arranged to diverge from their upstream to their downstream ends, to maintain a diverging envelope around said electron beam as it diverges downstream toward said dissecting aperture; adjustable voltage sources integral with said voltage divider network to establish static potentials for said X and Y deflection plates; a capture voltage source for adjustably selecting a capture voltage corresponding to the voltage output of said electron multiplier for an initial target position; a differential amplifier connected to said electron multiplier output and said capture voltage source to produce a signal proportional to the difference between said capture voltage and said electron multiplier output; a pair of corona discharge tubes for connecting the output of said differential amplifier to one pair of said deflection plates to superimpose the output voltage of said differential amplifier upon said deflection plate static voltage, thereby substantially retaining the location of said electron image upon said dissecting aperture, regardless of displacement of said optical image upon said photocathode; cathode follower means for producing an output signal corresponding to the output of said differential amplifier but isolated therefrom and transformed to a lower impedance; servo operated gimbal means for moving said tube to restore said optical image to a position corresponding to said initial target position; integrating circuit means for integrating displacement indicated by said deflection plate voltage with displacement of said Z axis indicated by the movement of said gimbal axes to produce net displacement information; and recording means for simultaneously recording said displacement information and the time of said displacement.

11. A displacement follower that includes:
an image dissector tube that comprises a photocathode having an image-transformation surface and comprises an image shield having a dissecting aperture, said photocathode surface and said image shield being disposed at spaced-apart positions along an electron-beam path extending from said photocathode to said image shield, and means for reproducing on said image shield in the region of said dissecting aperture an electron image corresponding to an optical image formed at said photocathode surface;

beam deflection means for deflecting said electron beam relative to said aperture whereby the magnitude of the current of electrons passing through said aperture varies as a monotonic function of the beam deflection as such line of contrast in said electron image moves across said aperture from one end thereof to the other;

anode means downstream from said dissecting aperture for collecting a current of electrons that pass through said aperture;

means for focusing on said photocathode surface an optical image of a moving object establishing a line of contrast between relatively bright and dark zones whereby a corresponding line of contrast in said electron image extends across said dissecting aperture from one side thereof to the other;

beam deflecting means controlled by the electron current collected by said anode for deflecting said electron beam in a direction opposing the movement of said line of said electron image otherwise resulting from movement of said optical image on said photocathode surface;

and signal means also controlled by the collected electron current in accordance with the magnitude thereof for indicating movement of said optical image on said photocathode surface.

12. A displacement follower that includes:
an image dissector tube that comprises a photocathode having an image-transformation surface and an image shield having a dissecting aperture, said photocathode and said image shield being disposed at spaced-apart positions along an electron beam path; and means for reproducing on said image shield in the region of said dissecting aperture an electron image corresponding to an optical image formed at said photocathode surface;

anode means downstream from said dissecting aperture for collecting a current of electrons that passes through said aperture;

amplifier means connected to said anode means and controlled by said electron current for producing an electric signal that changes in a predetermined sense as a line of contrast in said electron image moves in a predetermined direction across said aperture from one end thereof to the other thereby gradually increasing the strength of said electron current and that changes in the opposite sense as said line of contrast moves in the opposite direction across said aperture from one end thereof to the other thereby gradually decreasing the strength of said electron current;

beam deflection means controlled by said electric signal for deflecting said electron beam in a direction to oppose a change in said electron current;

and signal means responsive to said electric signal in accordance with the magnitude thereof.

13. A displacement follower that includes:
an image dissector tube that comprises a photocathode having an image-transformation surface and comprises an image shield having a dissecting aperture, said photocathode surface and said image shield being disposed at spaced-apart positions along an electron-beam path extending from said photocathode to said image shield, and means for reproducing on said image shield in the region of said dissecting aperture an electron image corresponding to an optical image formed at said photocathode surface;

anode means downstream from said dissecting aperture for collecting a current of electrons that pass through said aperture;

means for focusing on said photocathode surface an image of an object having a line of contrast between relatively bright and dark zones whereby a corresponding line of contrast in said electron image extends across said dissecting aperture;

a capture voltage source for adjustably selecting a capture voltage for establishing a reference value of said collected electron current;

means connected to said anode for generating a signal voltage corresponding to said collected electron current;

a differential amplifier controlled by said capture voltage source and said signal to produce a control signal in accordance with the difference between said two voltages;

beam deflection means controlled by the output of said differential amplifier for deflecting said electron beam in a direction to oppose a change in said collected electron current otherwise resulting from movement of said optical image on said photocathode surface;

and signal means also controlled by the output of said differential amplifier for indicating movement of said optical image on said photocathode surface.

14. A displacement follower that includes:

an image dissector tube that comprises a photocathode having a surface and an image shield having a dissecting aperture, said photocathode surface and said image shield being disposed at spaced-apart positions along an electron beam path extending from said photocathode to said image shield and transversely of said path, said dissector tube including means for reproducing on said image shield in the region of said dissecting aperture an electron image corresponding to an optical image formed at said photocathode surface;

means for focusing on said photocathode surface an optical image of a moving object establishing a line of contrast between relatively bright and dark zones;

means including a capture voltage source for applying an adjustable capture voltage to said beam deflection means whereby a line of contrast in said electron image corresponding to the line of contrast between said relatively bright and dark zones extends across said dissecting aperture;

anode means downstream from said dissecting aperture for collecting a current of electrons that pass through said aperture;

beam deflection means connected to said anode and controlled by a change in the collected electron current occurring therein because of movement of said line of said electron image resulting from movement of said optical image on said photocathode surface for deflecting said electron beam in a direction to oppose such change in electron current;

and signal means controlled by the collected electron current for indicating movement of said optical image on said photocathode surface.

15. A displacement follower that includes:

an image dissector tube that comprises a photocathode having an image-transformation surface and comprises an image shield having a dissecting aperture, said photocathode surface and said image shield being disposed in said tube at spaced-apart positions along an electron-beam path extending from said photocathode to said image shield, and means for reproducing on said image shield in the region of said dissecting aperture an electron image corresponding to an optical image formed at said photocathode surface;

a single electron multiplier amplifier within said tube, said electron multiplier having a collector electrode for collecting a current of electrons that pass through said aperture;

beam deflection means for deflecting said electron beam relative to said aperture whereby the magnitude of the current of electrons passing through said aperture varies as a monotonic function of the beam deflection as such line of contrast in said electron image moves across said aperture from one end thereof to the other;

anode means downstream from said dissecting aperture for collecting a current of electrons that pass through said aperture;

means for focusing on said photocathode surface an optical image of a moving object establishing a line of contrast between relatively bright and dark zones whereby a corresponding line of contrast in said electron image extends across said dissecting aperture from one side thereof to the other;

beam deflecting means controlled by the electron current collected by said anode for deflecting said electron beam in a direction opposing the movement of said line of said electron image otherwise resulting from movement of said optical image on said photocathode surface;

and signal means also controlled by the collected electron current in accordance with the magnitude thereof for indicating movement of said optical image on said photocathode surface.

16. A displacement follower that includes:

an image dissector tube that comprises a photocathode having a surface and an image shield having a dissecting aperture, said photocathode surface and said image shield being disposed at spaced-apart positions along an electron beam path extending from said photocathode to said image shield and transversely of said path, said dissector tube including means for reproducing on said image shield in the region of said dissecting aperture an electron image corresponding to an optical image formed at said photocathode surface;

means for focusing on said photocathode surface an optical image of a moving object establishing a line of contrast between relatively bright and dark zones;

anode means downstream from said dissecting aperture for collecting a current of electrons that pass through said aperture;

means for establishing a capture voltage that is independent of the deflection of said beam;

means including an amplifier connected to said anode for generating a signal voltage corresponding to said collected electron current;

a differential amplifier controlled by said capture voltage source and said signal voltage to produce a control signal in accordance with the difference between said two voltages;

means connecting the output of said differential amplifier to said beam deflection means for deflecting said electron beam in a direction to oppose a change in said collected electron current otherwise resulting from movement of said optical image on said photocathode surface;

and signal means also controlled by the output of said differential amplifier for indicating movement of said optical image on said photocathode surface.

17. In a system for tracking a moving object, the combination of:

a gimbal support rotatable about a first predetermined axis, a displacement follower mounted on said support and rotatable about a second axis transverse to said first axis, said displacement follower comprising an electron discharge device having a photocathode surface, an apertured image shield, means for forming on said shield an electron image of an optical image formed on said photocathode, means for collecting electron current passing through an aperture in said image shield, optical imaging means for forming on said photocathode an optical image of said moving object, and means for deflecting an electron image of said object relative to said aperture; and means responsive to changes in said electron current in response to movement of such electron image relative to said aperture for moving said support and said follower to counteract said relative movement of said electron image relative to said aperture.

18. A system for tracking a moving object as defined in claim 17 comprising:

means controlled by movement of said support and said displacement follower for indicating the path of travel of said object.

References Cited in the file of this patent

UNITED STATES PATENTS

| | | |
|---|---|---|
| 2,304,755 | Zworykin | Dec. 8, 1942 |
| 2,692,945 | Beaumont | Oct. 26, 1954 |